(12) United States Patent
Legallais et al.

(10) Patent No.: US 10,057,624 B2
(45) Date of Patent: Aug. 21, 2018

(54) SYNCHRONIZATION OF CONTENT RENDERING

(71) Applicant: THOMSON LICENSING, Issy de Moulineaux (FR)

(72) Inventors: Yvon Legallais, Rennes (FR); Christopher Howson, Corps-Nuds (FR); Anthony Laurent, Vignoc (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/424,499

(22) PCT Filed: Aug. 28, 2013

(86) PCT No.: PCT/EP2013/067749
§ 371 (c)(1),
(2) Date: Feb. 27, 2015

(87) PCT Pub. No.: WO2014/033140
PCT Pub. Date: Mar. 6, 2014

(65) Prior Publication Data
US 2015/0229986 A1 Aug. 13, 2015

(30) Foreign Application Priority Data

Aug. 30, 2012 (EP) .................................... 12306035

(51) Int. Cl.
*G06F 3/00* (2006.01)
*H04N 21/43* (2011.01)
(Continued)

(52) U.S. Cl.
CPC ..... *H04N 21/4307* (2013.01); *H04L 65/4076* (2013.01); *H04L 65/4084* (2013.01);
(Continued)

(58) Field of Classification Search
CPC .......... H04N 7/17318; H04N 21/4722; H04N 21/4126; H04N 21/4622
See application file for complete search history.

(56) References Cited

U.S. PATENT DOCUMENTS 6,609,167 B1 * 8/2003 Bastiani ............... G06F 13/4291
710/10
6,751,213 B1 * 6/2004 Sun .................... H04L 12/40163
370/352
(Continued)

FOREIGN PATENT DOCUMENTS

CN 101889422 11/2010
CN 102067550 5/2011
(Continued)

OTHER PUBLICATIONS

Biersack etal: "Intra-and inter-stream synchronisation for stored multimedia streams", Proceedings of the Third IEEE International Conference on Multimedia Computing and Systems, Jan. 1, 1996, pp. 372-381.
(Continued)

*Primary Examiner* — Mushfikh Alam
(74) *Attorney, Agent, or Firm* — Jerome G. Schaefer

(57) ABSTRACT

A method for controlling a rendering time of a second video content stream on a second device to be synchronized with a rendering time of a first video content stream on a first device, said second video content stream being organized in chunks, includes receiving by a control device a request of a chunk of the second video content stream from the second device, receiving by the control device, the packets of the requested chunk, and delivering by the control device the requested chunk to the second device at a delivery time at which said requested chunk should be delivered to the second device so that the rendering time of the second video
(Continued)

content stream on the second device is synchronized with the rendering time of the first video content stream on the first device.

12 Claims, 2 Drawing Sheets

(51) Int. Cl.
| | | |
|---|---|---|
| H04N 21/6543 | (2011.01) | |
| H04N 21/845 | (2011.01) | |
| H04L 29/08 | (2006.01) | |
| H04L 29/06 | (2006.01) | |

(52) U.S. Cl.
CPC ............ *H04L 65/608* (2013.01); *H04L 65/80* (2013.01); *H04L 67/289* (2013.01); *H04L 67/2842* (2013.01); *H04N 21/6543* (2013.01); *H04N 21/8456* (2013.01)

(56) References Cited

U.S. PATENT DOCUMENTS

| | | | |
|---|---|---|---|
| 7,743,161 B2 | 6/2010 | Dey et al. | |
| 2004/0210944 A1* | 10/2004 | Brassil ................ | H04L 12/1895 725/135 |
| 2005/0259875 A1* | 11/2005 | Imura .................... | H04N 19/00 382/232 |
| 2006/0018259 A1* | 1/2006 | Kadous ................ | H04L 1/1829 370/236 |
| 2009/0064236 A1* | 3/2009 | Lee ........................ | H04H 20/18 725/62 |
| 2009/0276543 A1* | 11/2009 | Turner ................ | H04N 7/173 18 709/248 |
| 2009/0300673 A1* | 12/2009 | Bachet ................ | H04N 7/173 18 725/31 |
| 2010/0045568 A1 | 2/2010 | Schwartz et al. | |
| 2010/0077309 A1 | 3/2010 | Miyada | |
| 2010/0257280 A1 | 10/2010 | Stokking et al. | |
| 2010/0303100 A1 | 12/2010 | Niamut et al. | |
| 2011/0063503 A1* | 3/2011 | Brand .................. | H04N 5/4401 348/500 |
| 2011/0191816 A1 | 8/2011 | Henry et al. | |
| 2012/0144445 A1* | 6/2012 | Bonta ................. | H04L 12/1868 725/116 |
| 2012/0200774 A1 | 8/2012 | Ehlers, Sr. | |
| 2012/0233644 A1* | 9/2012 | Rao ..................... | H04M 1/7253 725/62 |
| 2013/0317829 A1* | 11/2013 | Ko ........................ | G10L 19/167 704/500 |
| 2013/0335629 A1 | 12/2013 | Laurent et al. | |
| 2014/0013381 A1* | 1/2014 | Herigstad .............. | H04N 7/163 725/141 |

FOREIGN PATENT DOCUMENTS

| | | |
|---|---|---|
| CN | 102256177 | 11/2011 |
| JP | 2004254122 | 9/2004 |
| JP | 2005039625 | 2/2005 |
| JP | 2010081262 | 4/2010 |
| WO | WO2011092244 | 8/2011 |
| WO | WO2012049305 | 4/2012 |

OTHER PUBLICATIONS

Boronat et al: "Multimedia group and inter-stream synchronization techniques: Acomparative study", Information Systems, vol. 34, No. 1, Mar. 1, 2009,pp. 108-131.
Van Deventer et al: "Advanced interactive television services require content synchronization",Systems, Signals and Image Processing,2008. IWSSIP 2008. 15th International Conference on, IEEE , Jun. 25, 2008, pp. 109-112.
Laukens: "Adaptive Streaming-a brief tutorial"; EPU Technical Review , 2011, pp. 1-6.
Stokking etal: "IPTV inter-destination synchronization: A network-based approach", Intelligence in Next Generation Networks (ICIN),2010 14th International Conference on, IEEE, Oct. 11, 2010, pp. 1-6.
Zambelli: "IIS Smooth Streaming Technical Overview", Mar. 31, 2009, Retrieved from the Internet: URL:http:\\img.prodek.lt/documents/IIS_Smooth_Streaming_Technical_Overview.pdf; pp. 1-18.
"Technicolor Launches Mediaecho, A Second Screen APP to Enrich Blu-Ray, VOD and Broadcast Viewing", Pres Release Nov. 8, 2011, pp. 1-2.
Howson et al: "Second Screen TV Synchronization", Int'l Conf. on Consumer Electronics, 2011 IEEE, pp. 361-265.
Huang et al: A Multilayered Audiovisual Streaming System Using the Network Bandwidth Adaptation and the Tow-Phase Synchronization; IEEE Transactions on Multimedia, vol. 11, No. 5, Aug. 2009; pp. 797-809.
Wikipedia page http://en.wikipedia.org/wiki/Acoustic_fingerprint; Dec. 17, 2014; pp. 1-4.
Fielding et al: "Hypertext Transfer Protocol HTTP/1.1", Jan. 1997http://tools.ietf.org/html/rfc2068; Dec. 17, 2014, pp. 1-162.
Laukens: "Adaptive Streaming—A Brief Tutorial" ; EBU Technical Review—2011 Q1 ; This version: Feb. 4, 2011; Published by the European Broadcasting Union; pp. 1-6.
http://en.wikipedia.org/wiki/Proxy_server; Dec. 17, 2014; pp. 1-11.
Muller etal: "Next-Generation Hybrid Broadcast Broadband Deliverable D4.1"; Apr. 12, 2012, Retrieved from the Internet:URL:http://www.hbb-next.eu/documents/HBB-NEXT D4.1; pp. 1-1-5.
Search Report Dated November 11, 2013.
NTT_Technical_Journal_The_Latest_Technical_Trend_in _IPTV.

* cited by examiner

SYNCHRONIZATION OF CONTENT RENDERING

This application claims the benefit, under 35 U.S.C. § 365 of International Application PCT/EP2013/067749, filed Aug. 28, 2013, which was published in accordance with PCT Article 21(2) on Mar. 6, 2014 in English and which claims the benefit of European patent application No. 12306035.2, filed Aug. 30, 2012.

FIELD OF THE INVENTION

The present invention generally relates to the processing of content streams originating from different sources and/or transmitted using different transport protocols and restored on at least one rendering device.

More particularly, the invention deals with the synchronization of such content streams, and especially with the control of the rendering time of a content on an auxiliary display so that it is perfectly synchronized with a related content being rendered on a main display. It finds application, in particular, in second screen television (TV) situations in which related contents are simultaneously rendered on a personal device, such as a smartphone, and on a TV set, for example.

Thus, the invention concerns a method and a device for controlling a rendering time of a content. It also concerns a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The complementary nature of broadcast and broadband IP networks has opened the door to a hybrid delivery model in which the strengths of each network are leveraged to provide personalized TV services. Such a delivery model is already being exploited by a number of actors in the TV landscape. The manufacturers of consumer equipments are providing "Connected TVs" incorporating broadband access to catch-up TV, enhanced program guides and Internet video.

Initiatives such as HbbTV (Hybrid Broadcast Broadband TV) and YouView have brought together broadcasters, content providers and Internet service providers seeking to define a standardized approach to the provision of hybrid broadcast broadband services. Whilst the first HbbTV services were launched as long ago as December 2009, current hybrid TV service deployments do not yet exploit the full potential of the Internet for the delivery of media content and there remains significant potential for further innovation.

By using broadcast delivery for mass distribution of popular programs and broadband delivery for long tail and on demand content, a combined delivery model is well adapted for providing personalized value-added TV services to large numbers of subscribers.

Companion terminals, such as tablets or smartphones, are becoming well established as "TV buddies" for the consumption of personalized content linked to TV broadcasts.

In the article of C. Howson et al. "Second Screen TV Synchronization", 2011 IEEE International Conference on Consumer Electronics, second screen use cases are envisaged, in which an alternative audio or video content, linked to broadcast programs, is carried over broadband, thereby enabling personalization and alleviating the burden on broadcast network bandwidth.

One example of such a service offers the user the possibility of selecting his preferred audio soundtrack on a handheld device, to accompany the broadcast video, displayed on a TV set. The main audio and video components are delivered over a broadcast network, whilst several other languages are available on-demand over the Internet.

Another such service would enable a user to select a broadband delivered alternative view of a sporting or music event and render this on his tablet, in conjunction with the broadcast content displayed on a TV set.

If the user experience of such second screen services is to be acceptable, then the media components, delivered separately over broadband and broadcast networks, need to be rendered with accurate synchronization.

Whilst existing hybrid TV services do employ trigger mechanisms for interactive applications, they do not incorporate techniques that would allow, for example, an alternative soundtrack delivered over the Internet to be automatically and accurately synchronized with a broadcast video component.

The above cited paper proposes a system, for the deployment of second screen personalized TV services, which enables the rendering of content components, delivered independently over broadband and broadcast networks, to be synchronized in user devices. The solution disclosed in this paper is based on the addition of an auxiliary component timeline associated with each group of media components delivered over the broadcast network and, in some cases, also over the broadband network. This timeline component conveys synchronization information related to each event and is used to align the presentation of the media components.

Other techniques also exist that allow to synchronize more or less accurately two renderers, as, for example, audio watermarking and audio fingerprinting.

However, the already existing techniques require that the second screen device comprises a player adapted to manage a temporal reference which is shared with the main screen device.

SUMMARY OF THE INVENTION

The present invention proposes a solution for improving the situation.

Accordingly, the present invention provides a method for controlling a rendering time of a second content stream on a second device, said second content stream being organized in chunks, each chunk corresponding to a part accessible individually of the second content stream, each chunk comprising data packets, said method comprising steps, carried by a control device, of:
   a) receiving a request of a chunk of the second content stream from the second device;
   b) determining a second position of said requested chunk in the second content stream on the basis of a playback position of a first content stream being rendered on a first device;
   c) receiving the packets of the requested chunk from a server (18); and
   d) delivering the requested chunk to the second device at a delivery time at which said requested chunk should be delivered to the second device so that the second device rendering of the second content stream is synchronized with the first device rendering of the first content stream, said delivery time being function of said second position.

Thus, in the present invention, the rendering time on the second device is controlled by delivering the data of the second content stream at the right moment to said second device. This method does not require any specific feature of a player application of the second device.

Consequently, the method of the present invention allows the deployment of a second screen service on any device implementing a video player.

The method may also be used to control the rendering time of different video streams delivered over a broadband network to a plurality of terminals.

Preferably, the step of delivering uses an adaptive streaming protocol.

More particularly, this protocol is, for example, the HTTP (HyperText Transfer Protocol) adaptive streaming protocol.

In this case, each chunk of the second content stream is accessible individually by a separate URI.

Advantageously, the method further comprises steps, carried by the control device, of:

e) transmitting said packets of the requested chunk to the second device (6), except the last packet of the requested chunk; and f) buffering said last packet of the requested chunk, wherein the step d) of delivering comprises delivering said last packet of the requested chunk to the second device at the delivery time.

As, in the case of adaptive streaming, the moment at which the second device receives the last packet of the requested chunk determines the beginning of the rendering of said chunk, the time of delivery of this last packet to the second device forces the rendering time of the chunk by said device.

Advantageously, the method comprises a further step of determining a time necessary for a processing of the requested chunk by the second device.

This processing time is thus the time between the reception of the last packet of the requested chunk and the beginning of the rendering of this chunk. This processing time is specific to each type of player.

Preferably, if the requested chunk cannot be delivered at the delivery time at step d), the method comprises further steps of:

g) discarding said requested chunk;

h) repeating steps b) to d) with a chunk following said requested chunk in the second content stream.

In a particular embodiment of the invention, the first content stream and the second content stream carry a same content.

This is especially interesting in the case of a broadband network when it is needed to guarantee that a plurality of terminals render a same content at the same time.

The invention also provides a control device for controlling a rendering time of a second content stream on a second device so that the second device rendering of the second content stream is synchronized with a first device rendering of a first content stream, said control device being adapted for performing the steps of the method of the invention.

According to a first embodiment, the control device is a home gateway or a set-top box.

According to a second embodiment, the control device is a proxy server.

For instance, the proxy server controls the rendering time of video streams delivered to a plurality of terminals over a broadband network, for example to guaranty that all the users in a same area discover an event at the same time. In that case, the rendering time may be chosen so as to synchronize all the terminals to the latest one. It is also possible to decide to synchronize the video rendering of a live event to a textual description or an audio comment of this event. If the terminals are in movement, the rendering can start when they reach a specific position.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the method of the invention. The diagram of FIG. 3 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
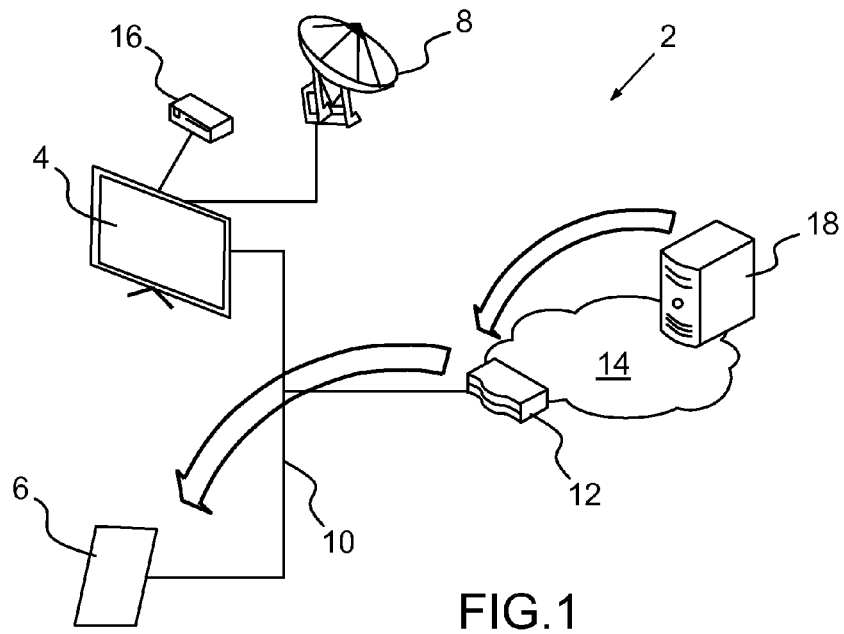
FIG. 1 is a schematic view of an embodiment of a system implementing the method according to the invention.

Referring to FIG. 1, there is shown therein a schematic view of a synchronization system 2 according to a preferred embodiment of the invention.

The synchronization system 2 comprises a first device, called main device 4, and a second device, called auxiliary device 6, located in a user's home. The main device 4 is, for instance, a TV set constituting a main display for the user, while the auxiliary device 6 is, for example, a smartphone, a PC laptop or a tablet. It comprises a video player and it is used as a second screen device by the user.

The content displayed on the main device 4 is received from an original content server (non represented) through a broadcast network. To receive such broadcast content, for example a DVB-T or a DVB-C multimedia stream, the main device 4 is linked to an antenna 8. The main device 4 is also connected, through a home network 10 to a home gateway 12 connected to the Internet 14.

The content displayed on the main device 4 can be also provided by any local or remote source like streaming from a remote or local audio and/or video server, a video file, a DVD, a Blu-ray Disc, etc. For this, the main device 4 is also connected to a local content source 16, for example a DVD and/or a Blu-Ray reader.

The main device 4 receives audio/video data and associated metadata allowing an identification of a current playback position within a TV program being rendered on said main device 4.

The auxiliary device 6 is also connected to the home network 10. Thus, it is connected, through the home gateway 12 and the Internet 14, to a complementary content server 18 containing contents related to the contents of the original content server.

The complementary content server 18 is able to provide to the auxiliary device 6, through the home gateway 12, an auxiliary content stream organized in chunks comprising video data packets.

The access to the complementary service is, for example, provided by the home gateway 12 to the auxiliary device 6 thanks to information embedded in the broadcast stream received from the broadcast network.

In another embodiment, the auxiliary content provided by the complementary content server 18 is accessible to the auxiliary device 6 from a web site easily identified by the user because it is tightly coupled with the broadcast content received on the main device 4. This web site may be the web site of the broadcast provider or the web site of the studio which produced the main content provided from the original content server. The web site provides a URL (Uniform Resource Locator) to a manifest file which describes the available streams by detailing, for example, the used codecs, the encoding bit rates, the video resolutions, the markers, the captions and the URI (Uniform Resource Identifiers) to the chunks of the auxiliary content stream. This manifest file is called Media Presentation Description (MPD) in DASH (Dynamic Adaptive Streaming over HTTP). Other manifest files are used in proprietary adaptive streaming solutions; for example, from Adobe, Apple and Microsoft.

With these equipments of the user's home, it is possible for the user to receive a first multimedia stream, originating from the original content server, that will be rendered by the main device 4 and a second multimedia stream, originating from the complementary server 18, that will be rendered by the auxiliary device 6.

The user may wish to receive simultaneously related contents in both devices 4, 6. For instance, the user may wish to receive an alternative view of a sporting or music event and render this on the auxiliary device 6, in conjunction with the main content displayed on the main device 4.

Here, the audio/video complementary content rendered by the auxiliary device 6 is delivered to the home gateway 12 from the complementary content server 18 in adaptive HTTP streaming.

The synchronization system 2, and more particularly the home gateway 12, of the present invention enables a perfect synchronization of both contents in order to render them simultaneously on the devices 4, 6.

Indeed, the home gateway 12 has a privileged situation as it can access all the devices connected to the home network 10 and it is able to route all the incoming and/or outgoing Internet traffic.

Preferably, the home gateway 12 is configured in a transparent proxy mode. In such a configuration, the home gateway 12 is able to intercept the Internet communications without any specific configuration for the home devices 4, 6. It can analyze or modify the data coming from or dedicated to a web service.

Figure 2:
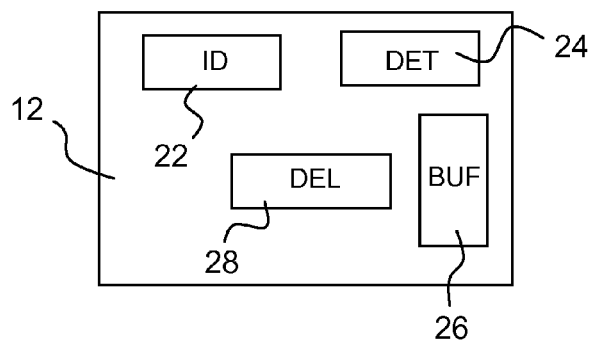
FIG. 2 is a schematic view of a control device according to an embodiment of the present invention.

As represented in FIG. 2, the home gateway 12 comprises an identification module 22 for identifying a main timing position, i.e. the playback position, of a main content stream being rendered on the main device 4.

Thus, the identification module 22 is able to retrieve information from the main device 4. Besides to the main timing position received within a TV program being rendered on the main device 4, the identification module 22 is able to accede to all the metadata which are delivered in the broadcast stream. Among these metadata, the identification module 22 is able to identify a URL permitting an access to the web service which provides a second view associated to the current consumed TV program on the main device 4.

The home gateway 12 also comprises a determination module 24 for determining, using said main timing position, a delivery time at which a next chunk of an auxiliary content stream, transmitted from the complementary content server 18, should be delivered to the auxiliary device 6 so that the auxiliary device rendering is synchronized with the main device rendering.

The home gateway 12 further comprises a buffer 26 for storing a video content and a delivery module 28 for delivering the video content to the auxiliary device 6 using adaptive HTTP streaming.

Figure 3:
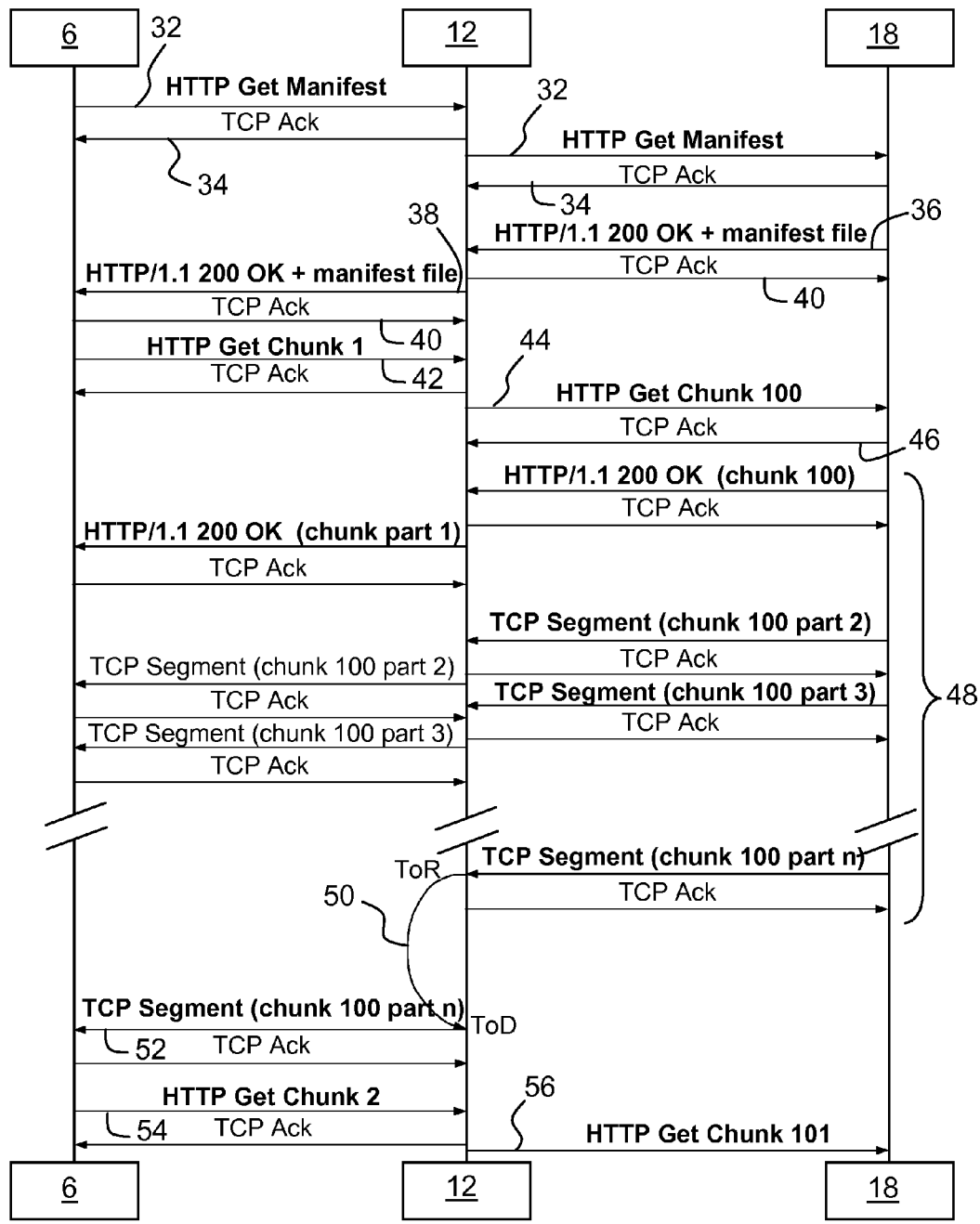
FIG. 3 is a flowchart showing the steps of a method according to an embodiment of the present invention.

FIG. 3 is a flowchart illustrating the steps of the method of the invention according to a preferred embodiment.

When the user selects the second view service, an HTTP Get request is sent, at step 32, to the complementary content server 18, through the home gateway 12, to obtain the manifest file.

The URL to this manifest file is known by the home gateway 12 as it has been provided with the meta-data of the TV program delivered in-band, using for example a timeline component as defined in the document WO2012049305, or watermarking data, or out-of-band, using for example an EPG (Electronic Program Guide) either directly, i.e. the manifest URL is indicated in the metadata, or indirectly, i.e. the metadata provide information to retrieve the manifest URL.

At step 34, the server 18 acknowledges the receipt of the request. It sends back, at step 36, the manifest file.

The home gateway 12 intercepts and forwards, at step 38, the manifest file when it is sent back by the complementary server 18. With the information contained in this description manifest file, the home gateway 12 is able to request itself the video chunks of the auxiliary content.

At step 40, the auxiliary device 6 acknowledges receipt of the manifest file.

Once it has interpreted the manifest file, i.e. the MPD in DASH terminology, the auxiliary device player sends, at step 42, a HTTP Get request to the complementary server 18. Having no indication for synchronizing the auxiliary content stream with the broadcast TV program, it requests the first chunk of the auxiliary stream from the server 18.

This HTTP request is intercepted, at step 44, by the home gateway 12. Having received the current position of the TV program rendered by the main device 4 and having the size of the video chunks through the intercepted manifest file, the home gateway 12 calculates the offset for the next chunk to be played in order to be synchronized with the main device rendering. It generates a new HTTP Get request dedicated to the complementary content server 18. For example, it is considered that the next chunk to be rendered is at index 100.

The complementary content may be stored on the complementary server 18 in a single file where each chunk position is well identified or in a series of files, each of them corresponding to each chunk. In the first case, when a client requests a chunk, it shall indicate the bytes range in the HTTP Get request. In the second case, it has just to request the file containing the desired chunk.

At step 46, the complementary content server 18 acknowledges receipt of the chunk request. Then, it responds, at step 48, to said chunk request with a HTTP partial content response, in the first case, or with an OK response, in the second case.

This type of response indicates that the complementary server 18 has fulfilled the GET request for the resource. The response includes a Content-Range or Content-length header field indicating the number of bytes which are served. For example, the chunk number 100 may have a size of 124832 bytes.

Here, the chunk is delivered in the form of several TCP packets, called aka segments and named part 1, part 2, . . . , part n in FIG. 3.

The requested video chunk could be displayed only once it has been completely delivered to the auxiliary device 6. In other words, this means that the rendering of the video on the auxiliary device 6 depends on the time when this device receives the last byte of the next chunk of this video. It is by controlling the delivery of this last byte to the auxiliary device 6 that the present invention allows to synchronize the second view to the main device 4.

More particularly, by analyzing each of the packet headers, the home gateway 12 calculates the number of bytes which has been delivered by the complementary content server 18.

When the last data packet (part n in FIG. 3) arrives at the home gateway 12, at the time of reception ToR, it is bufferized, at step 50, by said home gateway 12 up to a time of delivery ToD which is determined by the home gateway 12. The duration of the bufferizing is called the waiting time WT.

The delivery of the last part of the video chunk by the home gateway 12 to the auxiliary device 6 is done, at step 52, at the right moment so that the auxiliary device player then launches the rendering in synchronization with the main device 4.

Figure 4:
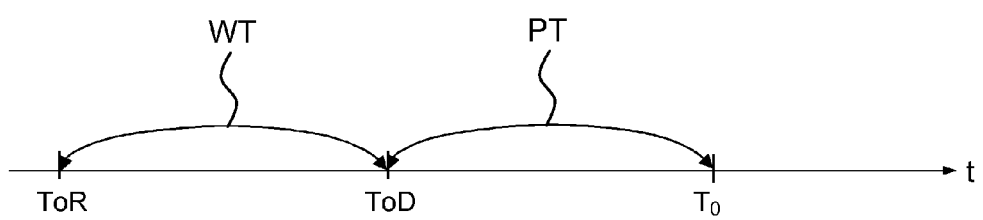
FIG. 4 is a time line illustrating the computation of the delivery time according to an embodiment of the present invention.

In FIG. 4, $T_0$ is the moment when the rendering of the video chunk shall start to be perfectly synchronized with the content currently displayed on the main device 4. The last packet of the chunk is sent by the home gateway 12 to the auxiliary device 6 at the time when the chunk must be rendered minus the delay due to the transmission, between the home gateway 12 and the auxiliary device 6, usually negligible in a home network, and the duration of the processing PT by the auxiliary device 6.

This processing time PT by the auxiliary device 6 is specific to the type of video player in said device. To accurately control the time of rendering, the home gateway 12 identifies automatically the browser plugin which is used as video renderer. Each commercial solution has its own player. Silverlight and QuickTime are two examples of such players for respectively Microsoft and Apple adaptive streaming solutions. The different solutions, even if they are compliant with DASH standard, use their own format of manifest file which describes the media format, i.e. the video codec, the available bit rates and the audio/video files URLs, for example. The analysis of the manifest file which is requested by the auxiliary device 6, at step 32, before starting the streaming allows the home gateway 12 to determine which adaptive techniques and consequently which player is used.

As a particular example, the player in the auxiliary device 6 is a HTML5 (HyperText Markup Language 5) video player. This version of the HTML language aims at improving video performance by not requiring a plug-in to be running, and opens the door to creating interactions between video and other elements on a web page that haven't been possible with the previous versions of HTML. The use of HTML5 can be also identified through the information provided within the HTTP Get sent by the auxiliary device, at step 32, to retrieve the video chunks.

In a lot of use cases, it can be sufficient to approximate the processing time without taking into account the type of plug-in used in the terminal.

If a problem occurs during the transmission of the chunk so that the last part of the chunk cannot be delivered at the right moment to ensure a perfect synchronization, the home gateway 12 takes the initiative to discard the current chunk and requests the next chunk to the complementary content server 18.

After the complete receipt of the chunk, the auxiliary device player sends, at step 54, a HTTP Get request to the complementary server 18. Having no indication about the index of the chunk, it requests the second chunk of the auxiliary stream from the server 18.

This HTTP request is intercepted, at step 56, by the home gateway 12 which generates a new HTTP Get request for the chunk having the index 101 to the complementary content server 18.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed as a reference to the plural and vice versa.

A person skilled in the art will readily appreciate that various parameters disclosed in the description may be modified and that various embodiments disclosed and/or claimed may be combined without departing from the scope of the invention.

For instance, in the above description, the synchronization according to the invention was carried by the home gateway. However, the method of the invention could be advantageously implemented by a set-top box.

Besides, while the description above concerned a use of the invention for a user's home application, the invention may be advantageously used for second screen applications in a public building as, for example, an airport, a railway station, a hospital, etc.

The invention can also be applied, by a proxy server, to control the rendering time of different video streams delivered over a broadband network. Such a control can be necessary for example to guaranty that all the users in a same area discover an event at the same time.

The proxy device can identify the streams it currently manages by analyzing the requests of the terminals it serves. Let's consider a first terminal which is consuming a first stream which is delivered in HTTP adaptive streaming mode from a web server. When a second terminal requests a second stream of the same event, the proxy server checks the timing position of the chunk currently delivered to the first terminal. By knowing the player type used in the first terminal, it can determine the time position of the content currently rendered on this first terminal. Consequently, by applying the method of the invention to deliver the audio/video content to the second terminal, it is guaranteed that the contents displayed on both terminals are synchronized. The same synchronization mechanism can be obviously applied to more than two terminals.

The invention claimed is:

1. A method performed by a synchronizing control device for controlling a rendering time of a second video content stream being displayed on a display screen of a second device to be synchronized with a rendering time of a first video content stream being displayed on a display screen of a first device, the method comprising:
   receiving, by the synchronizing control device, a request of a next chunk of the second video content stream from the second device, wherein the second video content stream is organized in chunks, each chunk comprising data packets corresponding to a part accessible individually of the second video content stream;
   receiving, by the synchronizing control device, the packets of the requested next chunk from a second content source;
   synchronizing the rendering time of the second video content stream being displayed on the display screen of the second device with the rendering time of the first video content stream being displayed on the display screen of the first device based on delivery timing of the requested next chunk of the second video content stream to the second device;
   wherein the synchronizing further comprises timing a delivery by the synchronizing control device to the second device of the last packet of the requested next chunk.

2. The method of claim 1, further comprising determining a time necessary for a processing of the requested next chunk by the second device.

3. The method of claim 1, wherein the first video content stream and the second video content stream include the same content.

4. A synchronizing control device for controlling a rendering time of a second video content stream being displayed on a display screen of a second device to be synchronized with a rendering time of a first video content stream being displayed on a display screen of a first device, the synchronizing control device configured to:
   receive, by the synchronizing control device, a request of a next chunk of the second video content stream from the second device, wherein the second video content stream is organized in chunks, each chunk comprising data packets corresponding to a part accessible individually of the second video content stream;
   receive, by the synchronizing control device, the packets of the requested next chunk from a second content source; and
   synchronize the rendering time of the second video content stream being displayed on the display screen of the second device with the rendering time of the first video content stream being displayed on the displayed screen of the first device based on delivery timing of the requested next chunk of the second video content stream to the second device by timing a delivery by the synchronizing control device to the second device of the last packet of the requested next chunk.

5. The synchronizing control device of claim 4, wherein the first video content stream and the second video content stream include the same content.

6. The method of claim 1, wherein if the requested next chunk cannot be delivered in time based on the delivery timing, the method further comprises:
   discarding the requested next chunk; and
   synchronizing the rendering time of the second video content stream being displayed on the display screen of the second device with the rendering time of the first video content stream being displayed on the display screen of the first device based on a delivery timing of a chunk after the requested next chunk.

7. The synchronizing control device of claim 4, wherein if the requested next chunk cannot be delivered in time based on the delivery timing, the synchronizing control device is further configured to:
   discard the requested next chunk; and
   synchronize the rendering time of the second video content stream being displayed on the display screen of the second device with the rendering time of the first video content stream being displayed on the display screen of the first device based on a delivery timing of a chunk after the requested next chunk.

8. The synchronizing control device of claim 4, wherein the synchronizing device is a home gateway or a set-top box.

9. The synchronizing control device of claim 4, wherein the synchronizing control device is a proxy server.

10. The method of claim 1, wherein the request is an HTTP Get request.

11. The method of claim 1, wherein the request is destined to a content server.

12. The method according to claim 11, wherein on reception of the request of a chunk, the synchronizing control device sends to the content server a second request of a second chunk, the second chunk corresponding to the chunk to be rendered at the delivery time.

* * * * *